United States Patent
Balthazor

(10) Patent No.: US 11,315,589 B1
(45) Date of Patent: Apr. 26, 2022

(54) DEEP-LEARNING SPECTRAL ANALYSIS SYSTEM

(71) Applicant: Victoria Balthazor, Palm Springs, CA (US)

(72) Inventor: Victoria Balthazor, Palm Springs, CA (US)

( * ) Notice: Subject to any disclaimer, the term of this patent is extended or adjusted under 35 U.S.C. 154(b) by 2 days.

(21) Appl. No.: 17/114,339

(22) Filed: Dec. 7, 2020

(51) Int. Cl.
| | |
|---|---|
| *H04R 29/00* | (2006.01) |
| *G10L 25/18* | (2013.01) |
| *G06N 3/08* | (2006.01) |
| *G10L 25/30* | (2013.01) |

(52) U.S. Cl.
CPC ............... *G10L 25/18* (2013.01); *G06N 3/08* (2013.01); *G10L 25/30* (2013.01)

(58) Field of Classification Search
CPC ...................................................... H04R 29/00
See application file for complete search history.

(56) References Cited

U.S. PATENT DOCUMENTS

| | | | | |
|---|---|---|---|---|
| 10,963,781 | B2* | 3/2021 | Barkan | G06N 3/0454 |
| 11,049,481 | B1* | 6/2021 | Li | G06F 16/61 |
| 2018/0144194 | A1* | 5/2018 | Park | H04N 21/4542 |
| 2019/0259378 | A1* | 8/2019 | Khadloya | G06N 3/08 |
| 2020/0320388 | A1* | 10/2020 | Lyske | G06F 40/30 |
| 2021/0256386 | A1* | 8/2021 | Wieman | G10L 15/22 |

\* cited by examiner

*Primary Examiner* — Olisa Anwah
(74) *Attorney, Agent, or Firm* — Intellent Patents LLC; Ahmed Alhafidh

(57) ABSTRACT

A waveform analysis method utilizes a convolutional neural network (CNN) to differentiate waveform data based on applying one or more pre-trained weights to pre-processed spectrograms sampled uniformly from the waveform data. The CNN outputs, in real-time, the level of confidence that any number of potential custom tags accurately describe the sampled waveform data. These outputs can vary across a single musical track. When these outputs are packaged with the track's metadata, a comprehensive searchable database can be formed which provides quantifiable means of differentiating qualitative features of music.

1 Claim, 15 Drawing Sheets

DEEP-LEARNING SPECTRAL ANALYSIS SYSTEM

FIELD OF TECHNOLOGY

This disclosure relates generally to audio processing systems, methods and devices, and, more particularly, to AI-based audio sensing.

BACKGROUND

Waveform data and associated spectral data contain countless qualitative features that are remarkably hard to quantify, especially in a way that is agnostic to the listener. Interpretation of analog waveform data to reach conclusions about meaningful metrics (genre, total quality, mood, tempo, key, progression(s)) involves complicated algorithms and more recently, artificial intelligence models which are trained to detect and extract multiple features from the waveform. However, these algorithms may be unable to incorporate feedback, may consume vast resources, require extreme computational efficiency, specialized hardware, and/or depend on trusted centralized data storage and processing centers.

Music consumers may seek to transcend their own library to discover new artists or new albums. In any case, familiarity is usually the bridge between a user's current music knowledge and, e.g., a soon-to-be discovered rock album. However, simply perusing endless aisles of rock vinyls or accepting the recommendations of a friend or a media provider (e.g., Rasputin Records, Spotify, Google Play Music, Apple Music) will yield a relatively low likelihood of discovering interesting new music. As a result, the user may stick to the same pool of music and stagnate since there exists no technology available to ease this transition.

Furthermore, modifying digital signal processing (DSP) settings in order to calibrate audio equipment according to, e.g., the genre of music playing or the room's acoustics, can be difficult for a traditional end-user without significant knowledge, software and/or hardware resources. Additionally, if a user enjoys a diverse variety of genres, the user would be hard-pressed to, e.g., manipulate the EQ settings each time the genre switches. Although numerous filters may be applied and even automated based on metadata, volume, or frequency distribution, the degree of specialization of such DSP settings is not granular enough to make a marked difference. As such, for a given set of equipment, a user may only listen to certain genres, tempos, artists, or other categories that sound well when played back through the equipment.

The difficulty in securing streaming contracts with copyright agencies introduces an insurmountable barrier for song-centered waveform analysis. Large media providers such as Spotify and Apple Music have the resources to secure copyright licenses, store enormous libraries of music, provide a robust streaming platform, and analyze user tastes and habits. However, even these media providers and streaming services do not have the computational capacity to perform the individualized analysis needed to overcome broad categorization of musical activity from user-to-user. Thus, the solution would typically involve relying on a client application to perform the necessary analysis. However, this analysis would utilize cached waveform data and risks violating licensing contracts by exposing such data in a reverse-engineerable way. Further pressured by growing privacy regulations, media providers have little incentive to innovate in this space, at least publicly.

Thus, there exists a need for intelligent waveform/spectral analysis that is user-driven, integrates with current media streaming services and audio input/output equipment, transmits non-reverse-engineerable data in a copyright-agnostic manner, crowdsources user waveform analysis and metadata, incorporates client device feedback, and quantifies numerous qualitative metrics.

SUMMARY

Aspects of the present invention are directed to an artificially intelligent waveform analysis engine. In one aspect, a waveform analysis method involves receiving, by a computing device, waveform data of a predetermined length. The method applies a Fourier transform to the waveform data to generate a corresponding spectrogram. One or more pre-processing steps are applied to the spectrogram. The method then involves generating one or more confidence values based on one or more pre-trained weights of a convolutional neural network (CNN). Each confidence value corresponds to a custom tag. The pre-processing steps can include applying Mel scaling to the spectrogram, applying or more window functions to the spectrogram, and cropping one or more portions of the spectrogram. The method may also involve relating the generated confidence value(s) of the waveform data to its metadata. This relation may be stored in a searchable table. The one or more pre-trained weights may be adjusted upon receiving one or more weight updates.

BRIEF DESCRIPTION OF THE DRAWINGS

The embodiments of this invention are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

Various systems, methods, and devices are described herein which provide an AI and human-based approach to waveform analysis that can be used to interpret countless qualitative metrics of musical compositions, create a complex and individualized profile of user listening habits, and drastically expand musical categories organically to allow spectral data to be differentiated in a more sophisticated manner.

Figure 1:
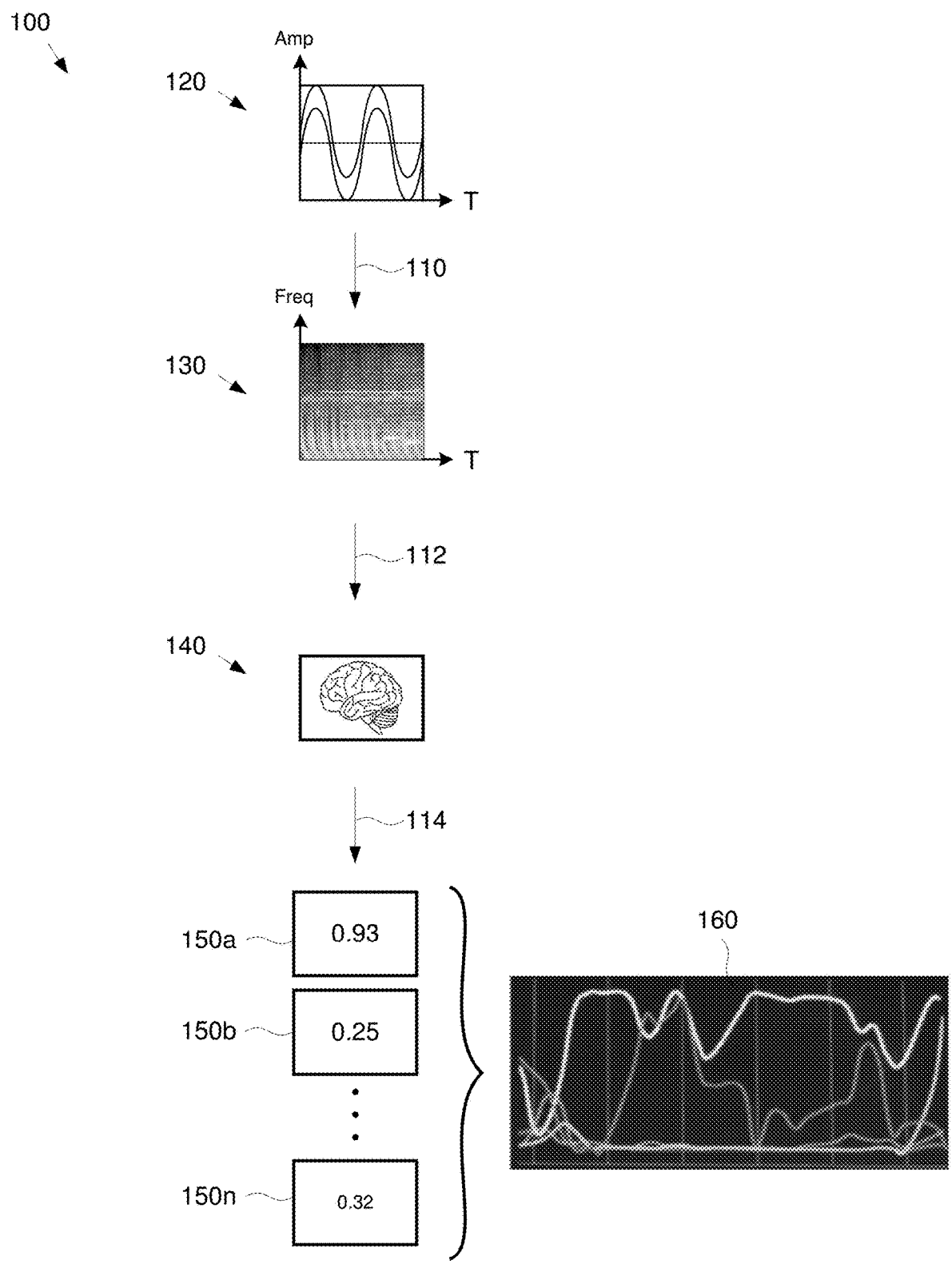
FIG. 1 is a process diagram showing an exemplary waveform analysis and classification method, according to one or more embodiments.

Referring to FIG. 1, an exemplary waveform analysis and classification method 100 is depicted. In a step 110, a waveform 120 of a predetermined length may be converted into a spectrogram 130. In a preferred embodiment, the waveform 120 may be approximately ten seconds in length to provide enough samples and generate an optimum resolution spectrogram. In a step 112, the spectrogram 130 image file may undergo one or more pre-processing steps to prepare the spectrogram 130 for input into a convolutional neural network (CNN) 140. Pre-processing steps may include applying aspects of Mel scaling as well as customized cropping/tapering and other pre-processing steps which, in combination with trained weights, provide the CNN with the tools to make a comprehensive analysis and classification of music while its playing back. In a step 114, the CNN 140 generates one or more confidence values 150A-N each corresponding to a custom tag. Example custom tags include, but are not limited to genre, mood, tonal quality, and musical key and/or progressions. Each custom tag and its related confidence value are tied to an entirely different trained neural network within the CNN architecture 140. Such tags may also be referred to as 'styles'. It should be clear that since rich waveform data and spectra are highly complex and can be filtered and modified in countless ways, there can be any number of categories that can finely differentiate music according to user-defined tastes or styles. There is also an expectation that correlations between different music can be based on machine-learned categories which are virtually or completely unobserved by the human experience. A style can be trained manually by feeding a large dataset of tagged music to train the CNN 140 to detect one or more spectrogram features associated with that style. Furthermore, using a crowdsourced training method, the CNN 140 may be user-trained by storing confidence values 150A-N associated with listened music. The confidence values 150A-N may be visualized graphically over time through a real-time graph 160.

Figure 2:
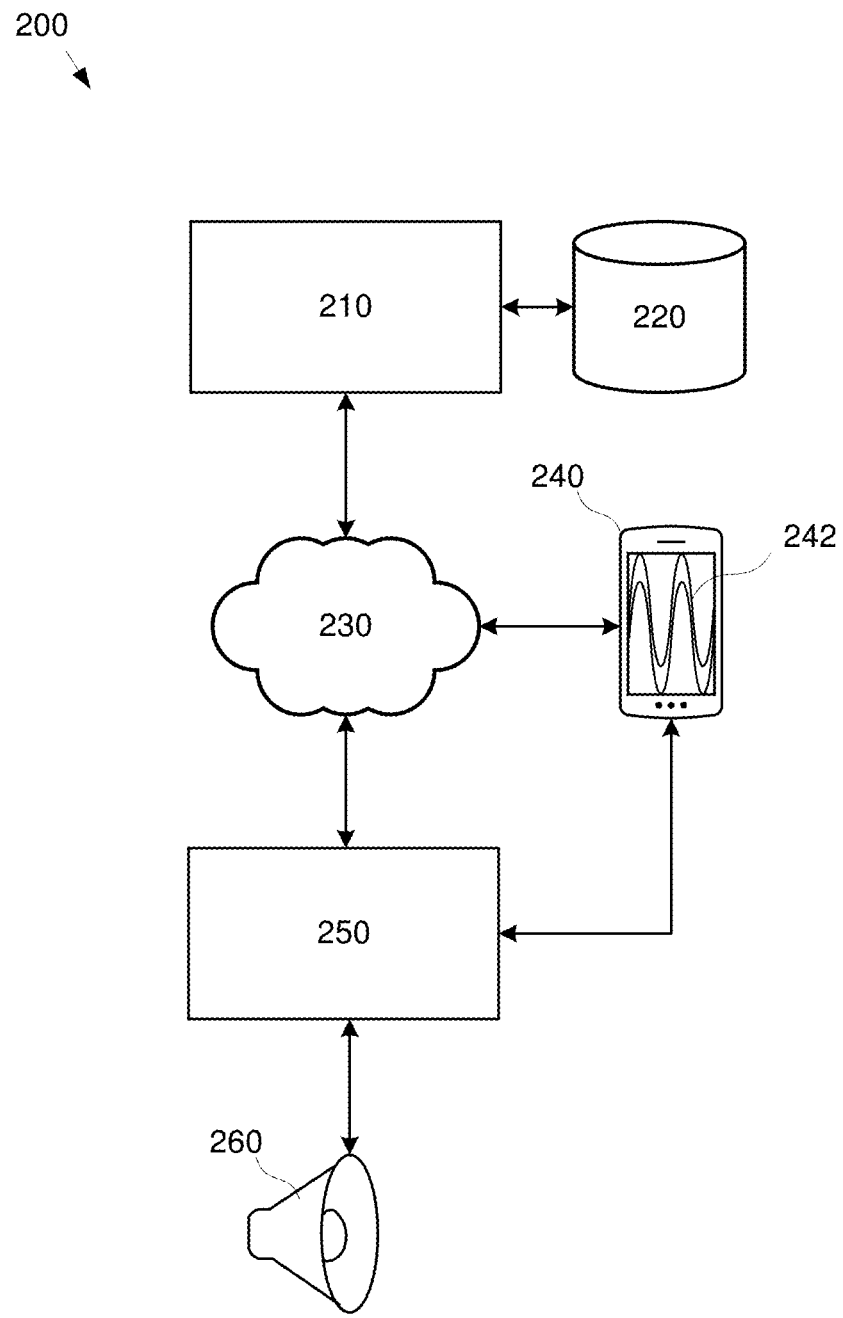
FIG. 2 is a block diagram showing an exemplary waveform analysis and classification system, according to one or more embodiments.

Referring to FIG. 2, a block diagram of an exemplary waveform analysis and classification system 200 is shown. In one embodiment, the waveform analysis and classification system 200 incorporates a server 210 associated with an internal or external data store 220. The server 210 may be communicatively coupled to a user device 240 through a network 230. The user device 240 may be a rich client device (e.g., a desktop, laptop, workstation) or a thin client device (e.g., a tablet, smartphone, smart-wearable) and at least comprises memory and processing facilities for storing and executing a companion application 242. The user device 240 may be communicatively coupled to a waveform analysis device (WAD) 250 configured to receive a streaming audio codec and relay the data signal to an audio output 260 (e.g., a receiver, a powered speaker). Meanwhile, waveform analysis can occur during music playback.

Figure 3:
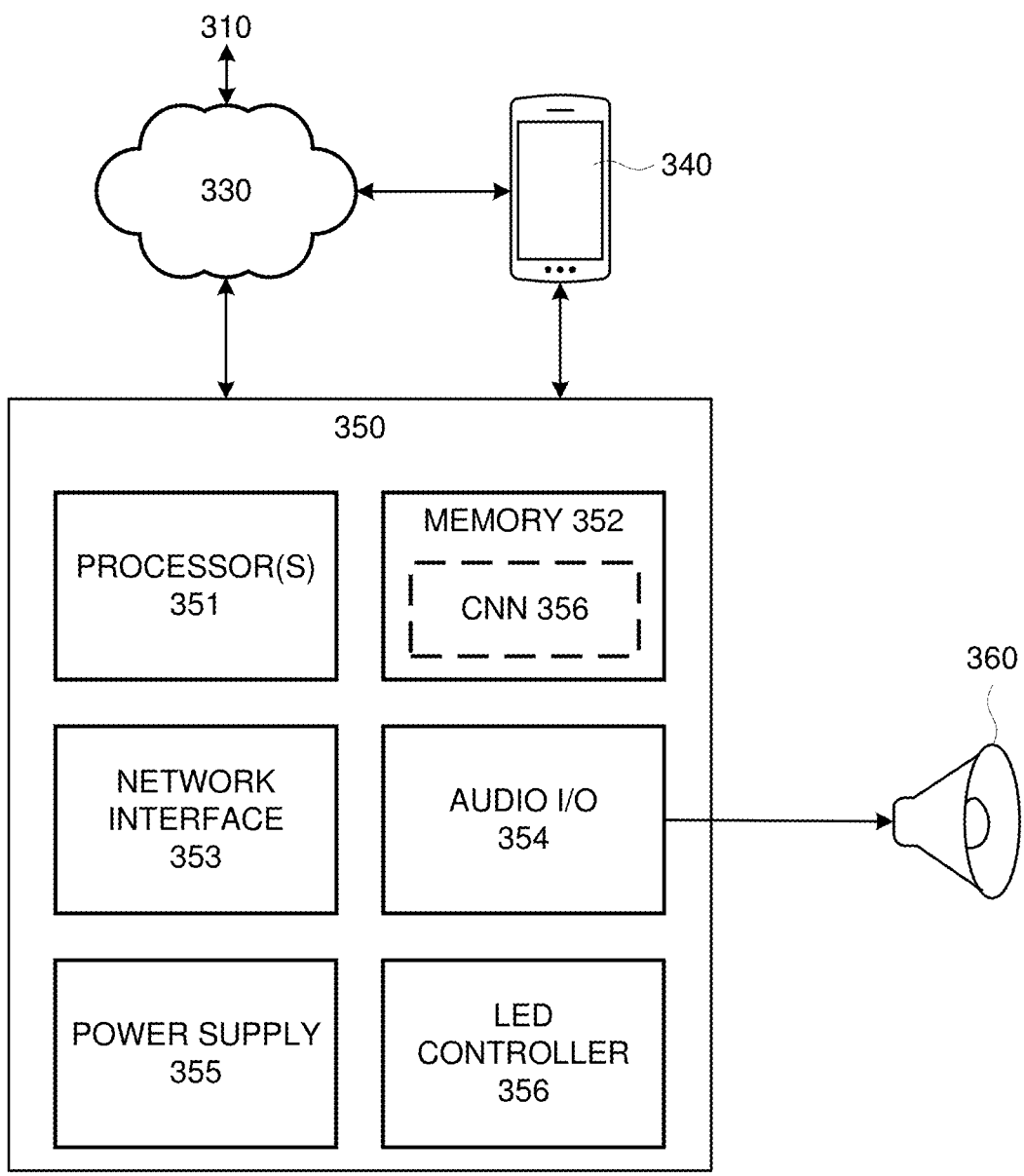
FIG. 3 is a block diagram showing an exemplary waveform analysis device, according to one or more embodiments.

Referring to FIG. 3, a block diagram of an exemplary WAD 350 is shown. In one embodiment, the WAD 350 may comprise one or more processor(s) 351 (at least a central processing unit (CPU) and optionally a graphics processing unit (GPU), digital signal processor (DSP) and/or a tensor processing unit (TPU)), memory devices 352 (i.e., volatile and non-volatile memory), network interface 353 (e.g., Ethernet, WiFi™, Bluetooth), audio output (and optionally input) 354, a power supply 355, and an LED controller 356. Some or all of the above components may be incorporated into a system on a chip (SoC). The power supply 355 provides conditioned power at the voltage(s) needed by the components. The LED controller 356 may be used, for example, to provide a booting indicator (typical SoCs take time to boot once initialized), show different colors corresponding with classifications tested by the CNN, or display an LED pattern matching the tempo of the tested sample of music playing through the WAD 350.

The WAD 350 may comprise a trained CNN 356 which may be utilized to perform one or more inference functions to determine one or more categorical confidence values. The WAD 350 may be configured as a networked media streaming device and may exist as an intermediary between the user device 340 and the audio input/output 350, which may utilize any number of jacks and ports to accept and/or transmit audio signals. The user device 340 may receive a streaming audio codec (according to a standard protocol, such as Airplay™) from a digital service provider, decode the audio stream (typically sampled at 44.1 kHz) and be able to play the audio stream through a speaker 360 coupled to the WAD 350 through the audio I/O 354. The network interface 353 allows the WAD 350 to communicate directly to the server 310 through the network 330 (i.e., a wide area network) or to the user device 340 through Bluetooth™ or WiFi™. The user device 340 may be configured to execute a companion application stored in memory 352 which may be utilized to view and modify WAD 350 performance, for example, by viewing real-time predication results for at least one style, configure settings, and select music for playback. Interface views are provided in FIGS. 7-15. The companion app may utilize WiFi™ to communicate with the WAD 350 using a predetermined port.

Figure 4:
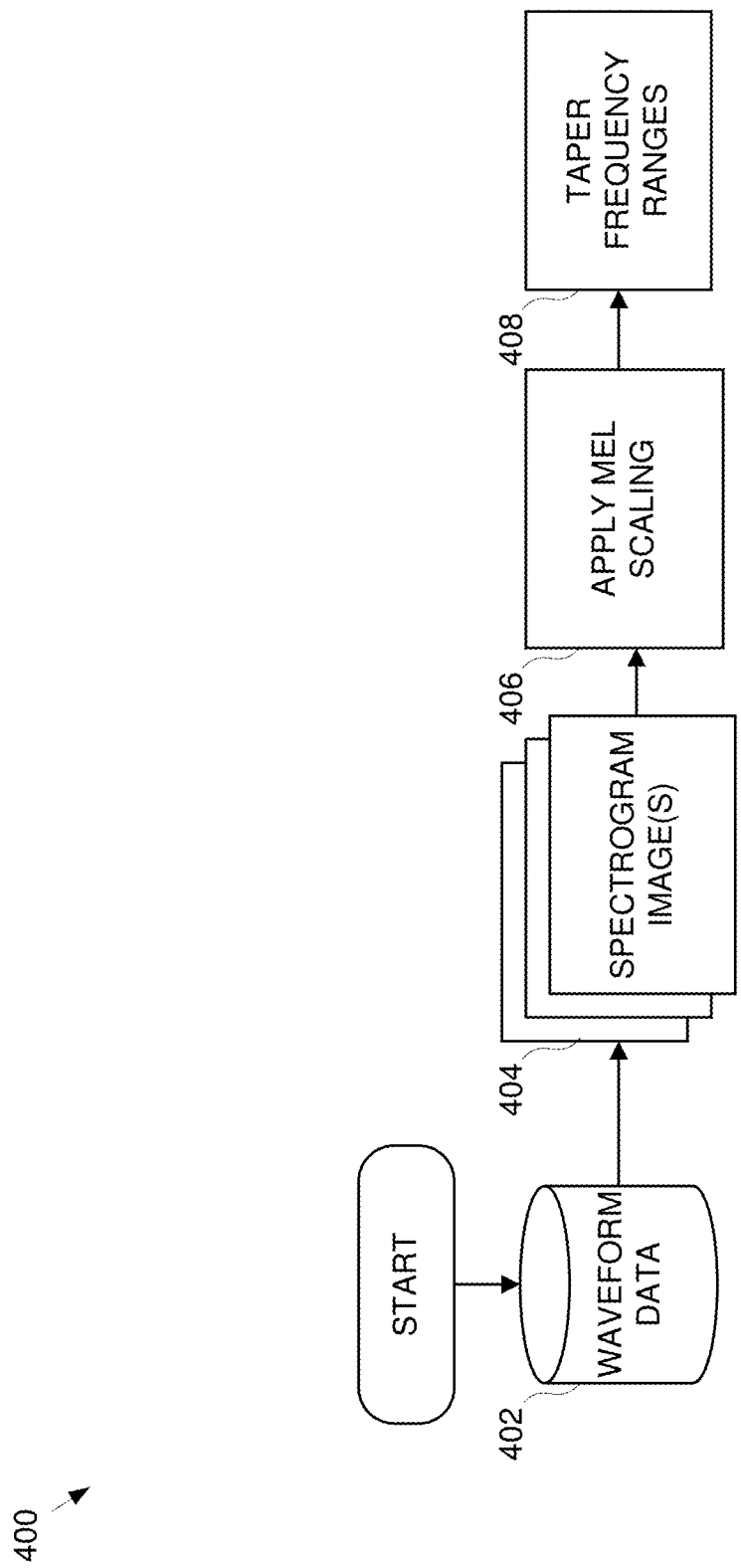
FIG. 4 is a process diagram showing an exemplary data processing stage performed prior to neural network processing, according to one or more embodiments.

Referring additionally to FIG. 4, a process diagram showing an exemplary data pre-processing stage is depicted. In one embodiment, a pre-processing method 400 may be applied to waveform data 402 to provide a satisfactory input for the CNN 356 by, for example, reducing noise which may obscure measurement of extraneous, redundant, irrelevant, or non-essential parameters. Difficulty is met here when trying to determine the significant algorithmic methodologies for aiding the CNN 356 in interpreting the analog metrics embedded within the spectrogram image files 404 generated by the WAD 350 based on the waveform data 402. The spectrogram image files 404 may be the products of Fourier transforms of waveform samples of uniform time length. A preferred sample time length may be approximately 10 seconds. Although the sample time length can be adjusted, 10 seconds is preferred because it is a compromise between obtaining faster results and obtaining accurate results. A large sample length may provide more data that can be leveraged to make an accurate inference, but the information in the resulting spectrogram data may be smeared; furthermore, too large a sample length and the inference would not occur close enough to real-time to be meaningful. In order to raise the sample length, the WAD 350 must have suitable processing and cooling facilities and the CNN must be appropriately sized and trained to accommodate the throughput while guaranteeing stable performance. However, this means that the entire sample must be played back before results can be displayed. On the other hand, lowering the sample length generates noise and too much may skew the results drastically and generate meaningless metrics. By analogy, asking an able-bodied human to recognize a piece of music with a 0.5 second sample would be futile—there is simply not enough information to make an informed analysis.

Furthermore, an adequate sample time length produces a spectrogram image file having dimensions optimized for the technical specifications of the WAD 350 and the sizing/architecture of the CNN. The CNN acts on varying light intensity between pixels in spectrogram, each pixel intensity representing the amplitude of corresponding frequencies on a log scale over time. However, one or more steps of pre-processing must be performed in order to render the spectrogram into a form that emphasizes qualitative features that are important to human listening.

After applying a Fourier transform to the waveform sample, Mel frequency scaling 406 may be applied to the spectrogram, which involves applying the following formula to convert f hertz into m mels, $$m = 2595 \log\left(1 + \frac{f}{700}\right).$$

The converted mel frequency ranges may be tapered 408 by applying one or more window functions; for example, a Kaiser window may be applied to the spectrogram. Other filtering techniques may be applied to focus on particular ranges of frequencies These and other pre-processing steps may be utilized to generate the appropriate input for the CNN 356.

Figure 5:
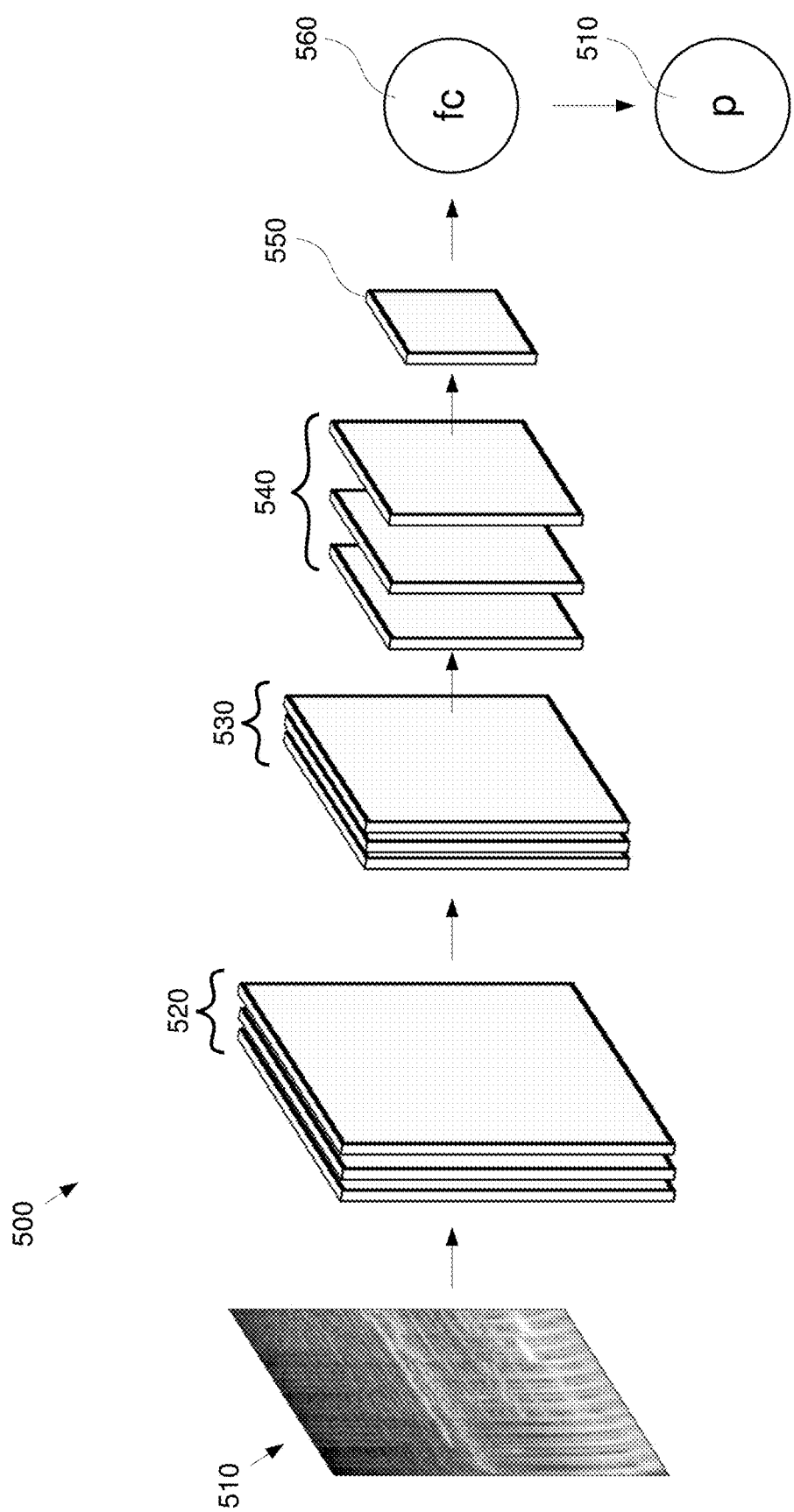
FIG. 5 is a diagram of a deep learning-based CNN architecture, according to one or more embodiments.

Referring to FIG. 5, an exemplary CNN 500 architecture is depicted. The CNN 500 may be trained to receive a pre-processed spectrogram image file according to the above principles, perform a targeted analysis with respect to a particular category of music, and produce a confidence metric indicative of the probability that the music associated with the spectrogram image falls within that category. For example, the CNN 500 may be trained to detect whether a particular piece of music falls within a 'classical music' category. The CNN 500 may be trained, for example, by introducing a comprehensive spectrogram library which has been predetermined (or tagged previously) as fitting within the 'classical music' category. Then, using the trained CNN 500, music actively playing may be analyzed in real-time or near real-time to determine a confidence metric associated with the 'classical music' category.

In an experimental case utilizing a Broadcom ARMv8 64-bit quad-core 1.2 GHz SoC, 1 GB of RAM, and 4 GB reserved for CNN usage, the CNN architecture 500 was modeled based on the CaffeNet model, a freely available deep learning architecture developed by Berkeley AI Research. The spectrogram 510 may undergo a convolution (kernel size 11, stride 4, pad 0) followed by a pooling layer (kernel size 3, stride 2, pad 0) and a normalization layer as shown in layers 520. These layers occur again (cony: kernel size 5, stride 1, pad 2)(pooling: kernel size 3, stride 2, pad: 0) in layers 530 and are followed by an additional three convolutions 540 at kernel size 3, stride 1, pad 1, after which the output undergoes an additional pooling layer 550 at kernel size 3, stride 2, pad 0. After pooling, the data is fully connected in one or more fully connected layers 560 and a softmax function (or sigmoid, or tanh) is applied to the raw output of the fc layers 560 (which may be unscaled) to produce a probability 570.

Figure 6:
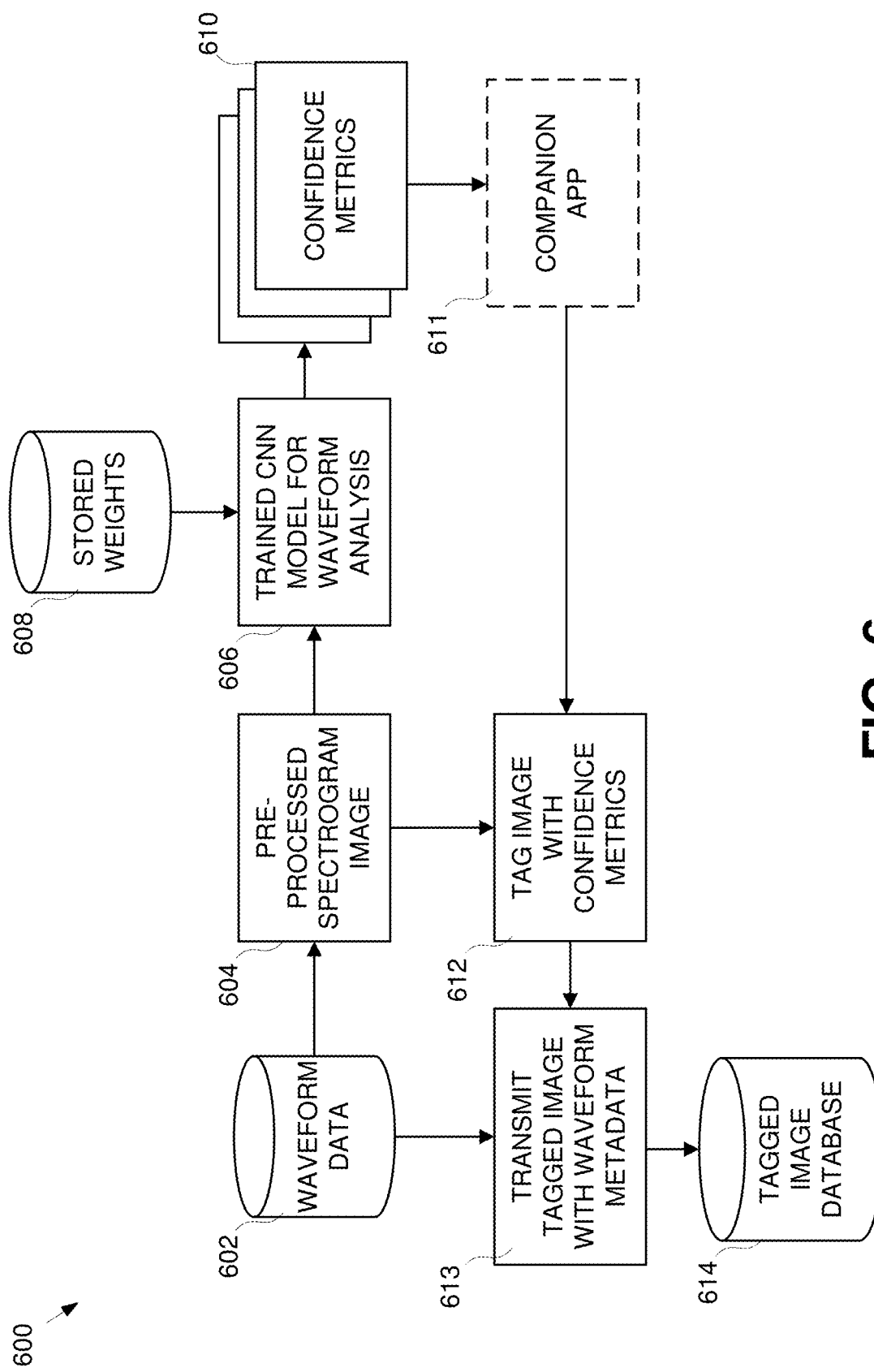
FIG. 6 is a process diagram showing a tagged image processing method, according to one or more embodiments.
Figure 7:
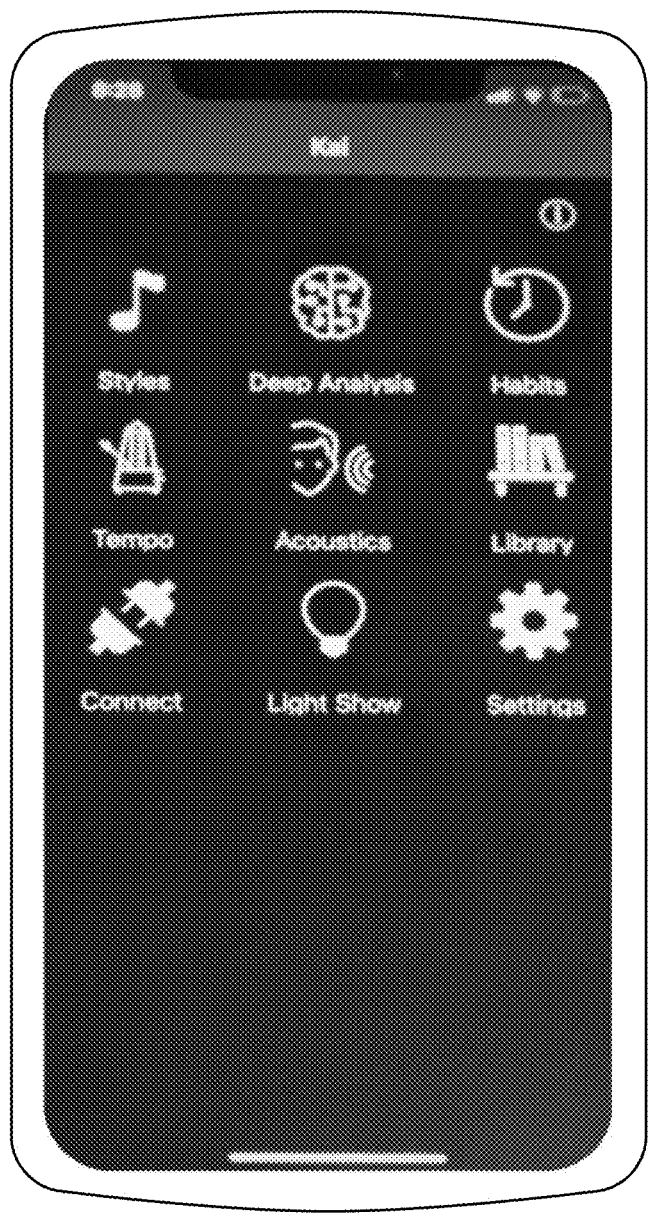
FIG. 7 is a user interface screen displaying a main screen of a companion application.
Figure 8:
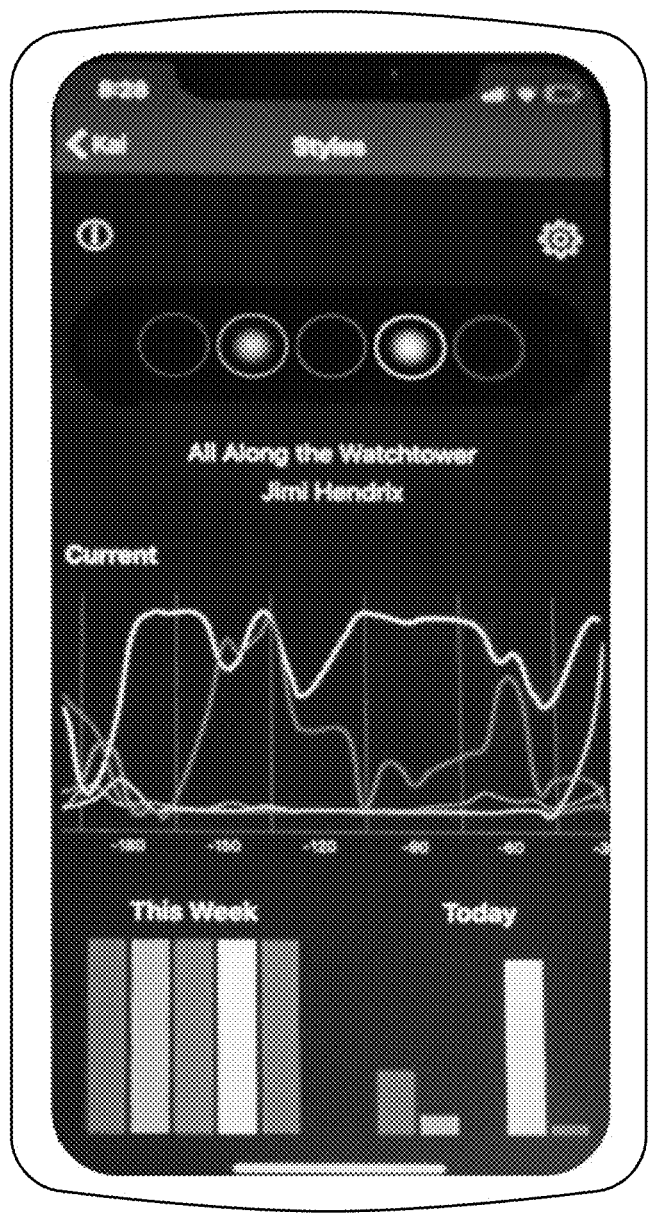
FIG. 8 is a user interface screen displaying a styles screen.
Figure 9:
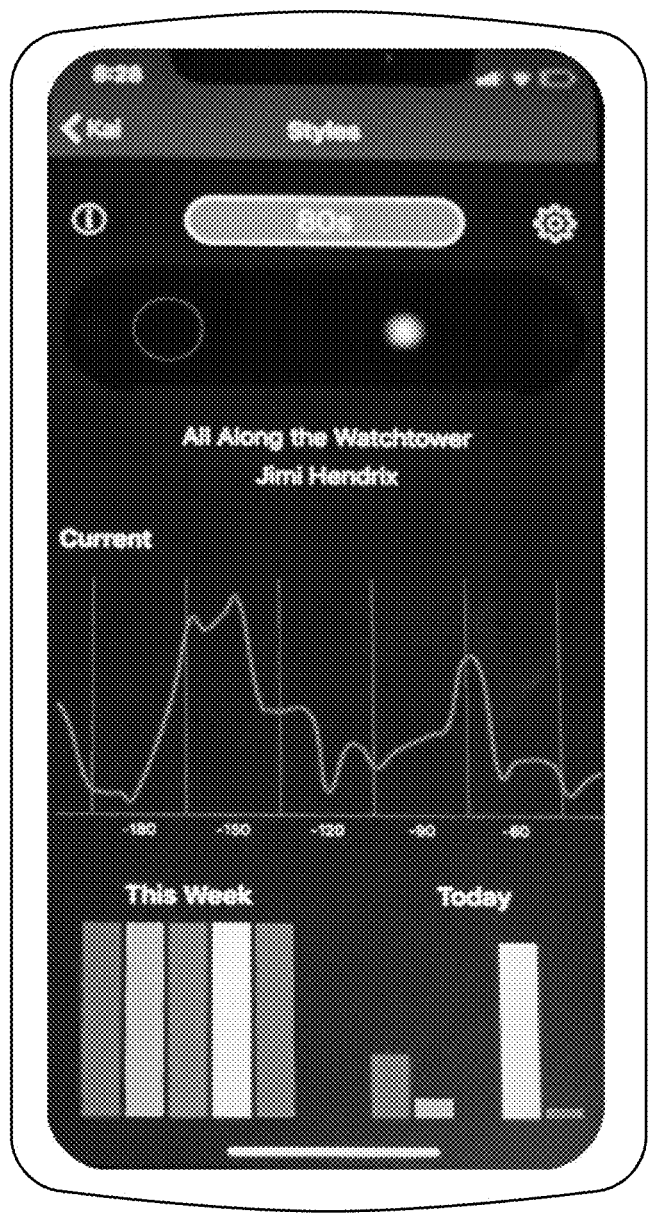
FIG. 9 is a user interface screen displaying a specific style selection in the styles screen of FIG. 8.
Figure 10:
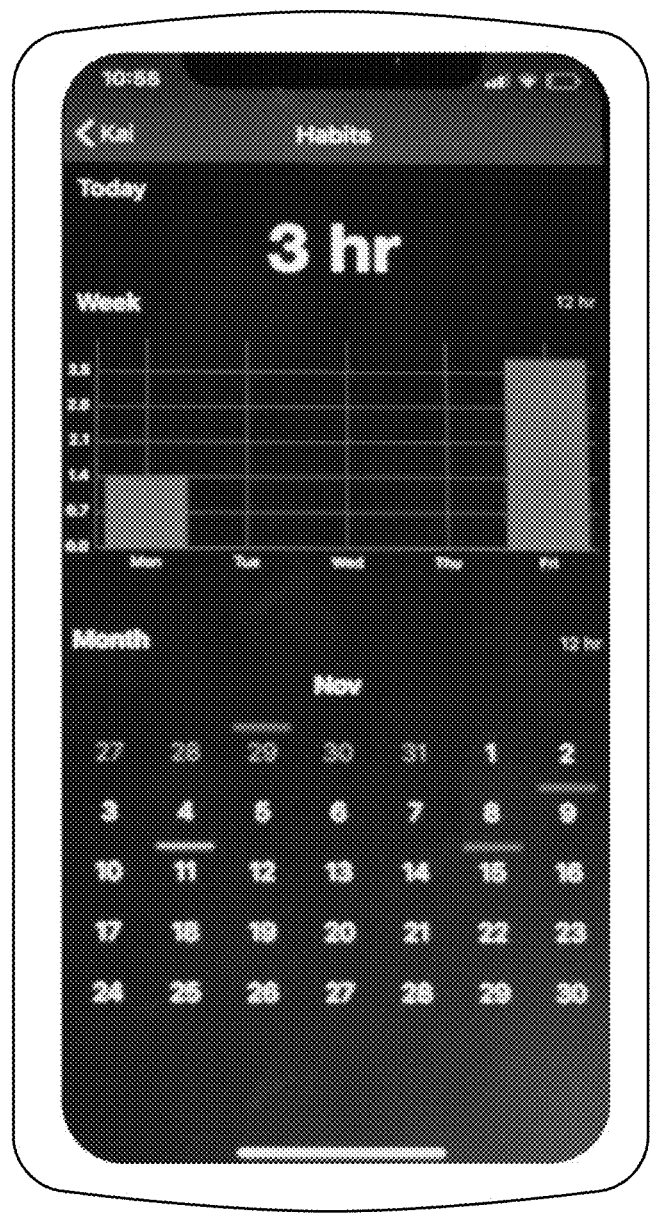
FIG. 10 is a user interface screen displaying a habits profile.
Figure 11:
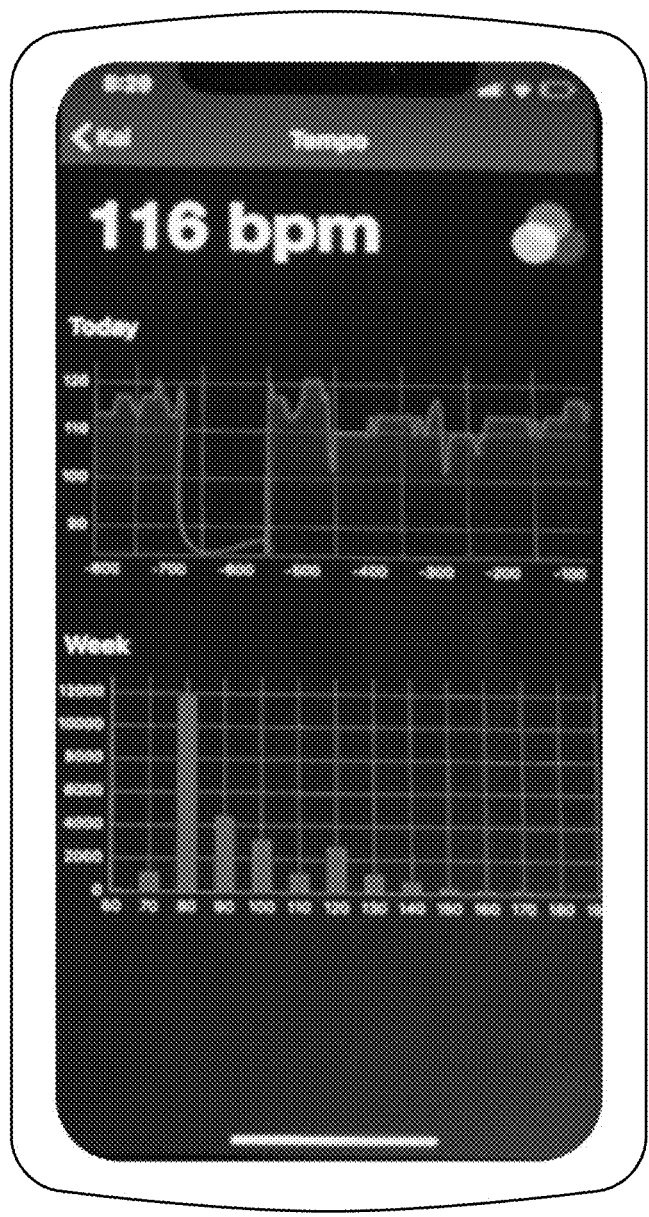
FIG. 11 is a user interface screen displaying a tempo visualization.
Figure 12:
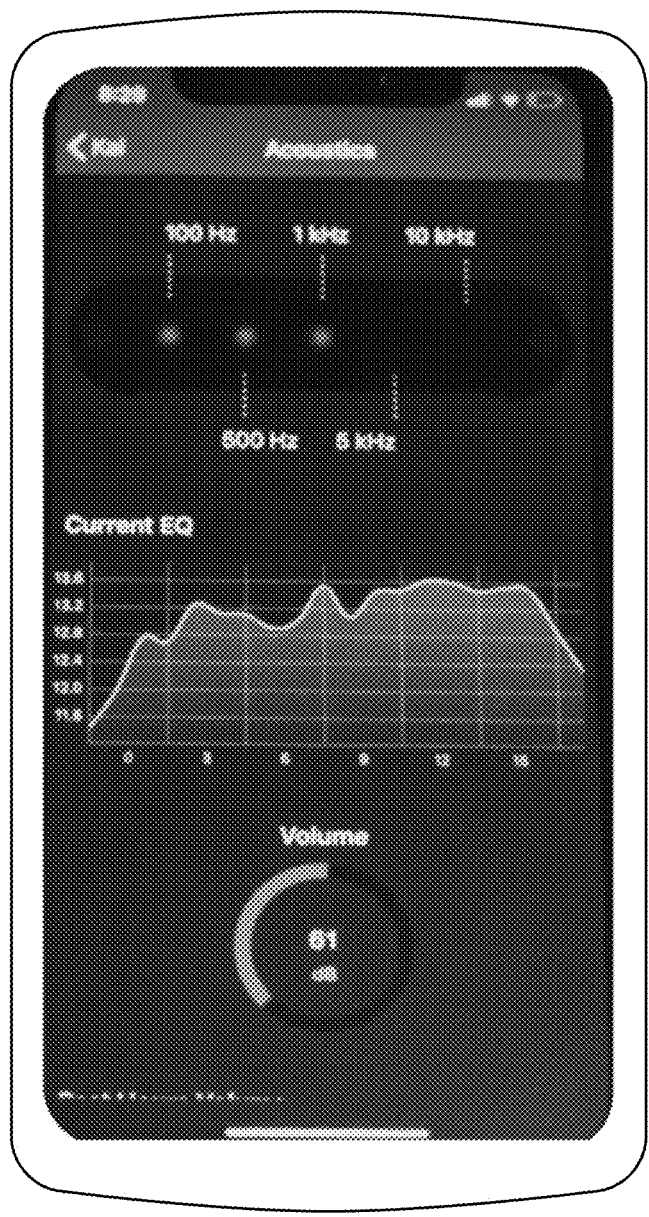
FIG. 12 is an acoustics user interface screen.
Figure 13:
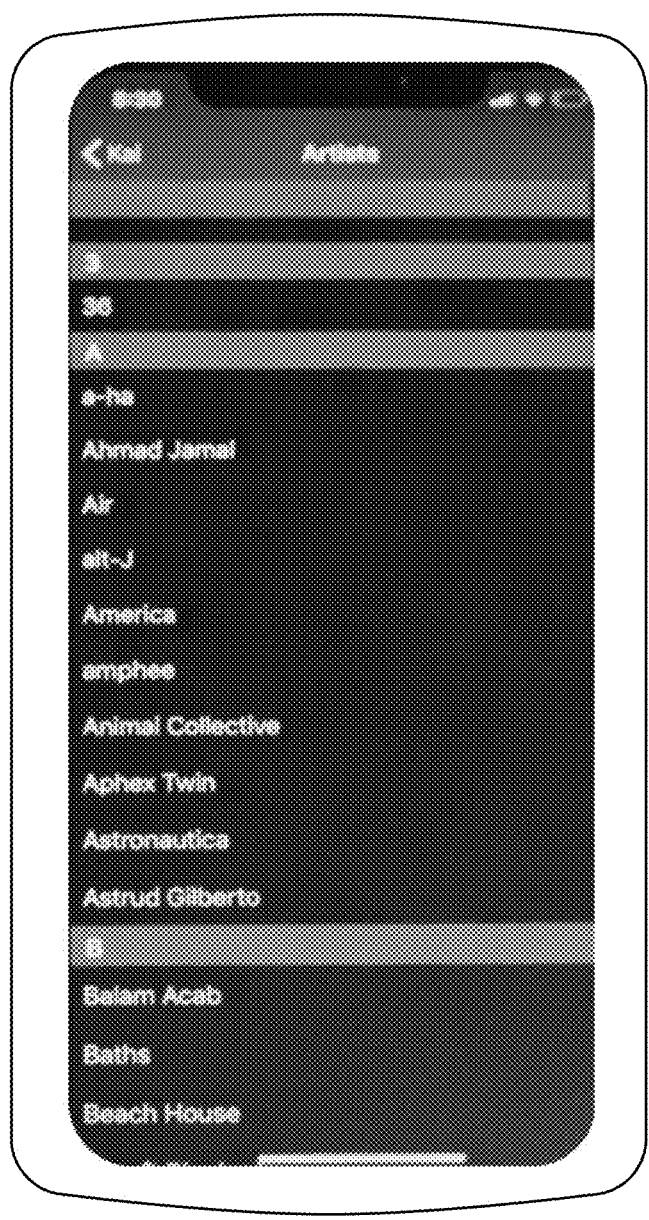
FIG. 13 is a library user interface screen displaying past played music.
Figure 14:
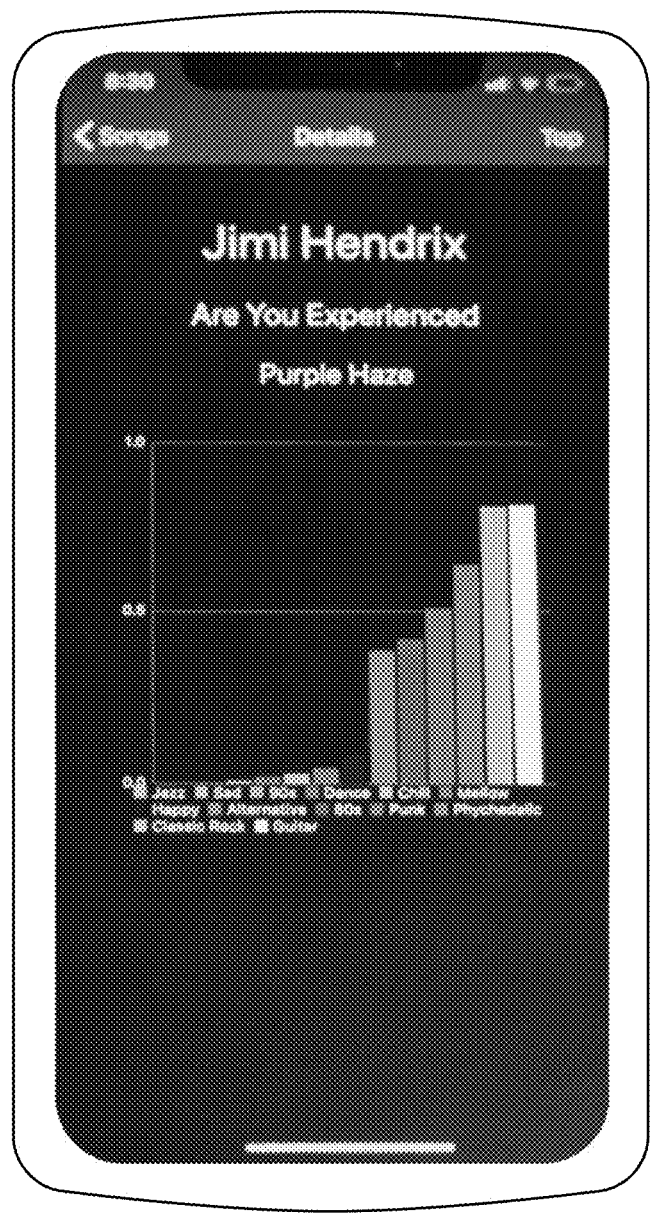
FIG. 14 is a song details screen displaying style analysis results.
Figure 15:
FIG. 15 is a deep analysis screen displaying full results for a specific song.

Referring to FIG. 6, a process diagram of a tagged imaged processing method 600 is shown. The method 600 may involve crowdsourcing the confidence metrics 610 associated with a spectrogram image 604 to a tagged image database 614. The confidence metrics 610 may be married with metadata derived from the waveform data 602 which the pre-processed spectrogram image 604 is based on, allowing the system to transmit waveform analytics 613 without sharing copyright-protected music data in a reverse-engineerable way. This method 600 may allow the server 210 of FIG. 2 to perform further analysis and training to improve the predictive power of the CNN 606 model by, for example, manipulating the stored weights 608, or increasing the classification capacity of the CNN 606, i.e., the type of confidence of metrics 610 which may be inferred by the CNN 606.

Referring also back to FIG. 3, processing tagged images involves an aggregated effort amongst WADs 350 of multiple users to provide confidence metrics 610 as individualized feedback accompanying the unique waveform data 602 being played back and processed simultaneously through the WADs 350. At an individual level the preferred embodiment involves converting the waveform data 602 to a spectrogram, rendering the spectrogram into a pre-processed spectrogram image 604, apply a trained CNN 606 to the pre-processed spectrogram image 604 to generate confidence metrics 610. The pre-processed spectrogram image 604 may then be tagged with the confidence metric(s) 612 and be transmitted with accompanying metadata 613 identifying, for example, the artist name, title, year, genre, or bitrate. The metadata (e.g., ID3 tags) is available agnostic to the original waveform, so it can be used to identify a waveform without the waveform being present. This avoids recovery and transmission of copyright-protected works, distributes computational power to user devices 340 and/or WADs 350, and provides a rich source of training data that can drastically accelerate the growth of further CNN models.

A CNN model may be trained to provide confidence metrics based on a comprehensive, tagged database associated with a specific metric such as genre (e.g., Jazz) or mood (e.g., happy). However, a centralized music database would be required in order to fully train the CNN model to provide analytics for any song. This creates a large barrier of entry for consumer electronics and metadata companies which provide rich services independently from centralized digital services providers. The above method 600 is a direct solution to this problem because it is a decentralized approach and only shares non-reverse-engineerable music data, i.e., spectrogram image files, textual metadata (e.g., song name, artist), and confidence metrics produced from the individual CNN of the device. This enables organic searching and categorization without having to build a centralized database or rely on an authority for labeling the music.

The proposed system makes it possible to analyze waveform data at a rapid rate, providing confidence metric(s) for regular intervals (e.g., 10 seconds). These confidence metric (s) allow the system to classify music in a way that meaningful to a human user, such as the probability that a particular 10-second interval is "easy listening" or "mellow." However, the next 10-second interval may be classified as "upbeat" or "energetic". Instead of relying on broad, oversimplified characterization of a piece of music, the system performs a richer analysis that gives rise to the possibility of finding comparisons that can only be made by the highly trained ear of a practiced musician. In other words, it is possible for the system to finely differentiate waveform data even within the same piece of music and enable comparisons between corresponding confidence metric(s). This has the effect of transcending common methods of analyzing, classifying, and interrelating waveform data across multiple musical tracks. Using this method, a music search engine would be able to more thoroughly explore the musical tastes of a user by analyzing the fluctuating confidence values corresponding to custom tags of songs in a user's library instead of relying on known factors, such as artist, genre, or mood.

For example, a user may indicate that she likes Bohemian Rhapsody by Queen. Individual waveform samples of Bohemian Rhapsody may be associated with high confidence metrics for their corresponding keys (i.e., B-flat major, E-flat major, A major, F major) 'operatic', 'piano ballad', 'hard rock', 'reflective coda', and other metrics that the CNN can easily be trained to recognize. Songs like Bohemian Rhapsody incorporate sections of recorded music which embody disparate styles. The described waveform analysis method tackles the difficult task of emulating the human ear's ability to judge the qualitative differences in waveform data. By applying the pre-trained weights of the CNN to pre-processed, uniformly-sampled spectrograms, the method calculates numerous inferences in parallel and acts as the translator between this quantifiable data and the potential qualitative descriptors of music. Since the method allows for the body of these qualitative descriptors (or custom tags) to grow with distributed use, the resulting data can contribute significantly to increasing the accuracy, breadth, and capacity of music search engines.

What is claimed is:

1. A computer-implemented method embodied in instructions executable by a processor of a computing device and stored in a memory of the computing device, comprising:
receiving waveform data of a predetermined length;
applying a Fourier transform to the waveform data to generate a spectrogram corresponding to the waveform data;
applying one or more pre-processing steps to the spectrogram;
generating, based on one or more pre-trained weights of a convolutional neural network (CNN), one or more confidence values each corresponding to a custom tag;
retrieving metadata associated with the waveform data;
relating the generated one or more confidence values with the metadata and storing the relations in a searchable table;
receiving one or more weight updates associated with the waveform data; and
based on the received weight update(s), adjusting at least one of the one or more confidence values associated with the waveform data.

* * * * *